UNITED STATES PATENT OFFICE.

FRANK J. PRADDEX, OF ALBANY, NEW YORK.

PROCESS OF PRESERVING EGGS.

SPECIFICATION forming part of Letters Patent No. 281,555, dated July 17, 1883.

Application filed August 17, 1882. (No specimens.)

*To all whom it may concern:*

Be it known that I, FRANK J. PRADDEX, a citizen of the United States, and a resident of the city and county of Albany, in the State of New York, have invented a new and useful Process for Preserving Eggs, of which the following is a full and exact description.

My invention relates to a process for preserving eggs in their shells in such manner that they will retain their purity and freshness for an unlimited time and during all changes of temperature; and it consists in first subjecting the eggs to a gentle heat for the purpose of expelling a portion of the air contained in them, and then applying to the shell of each egg a coat of glazing that will effectually repel the entrance of air and moisture through the pores of the shell, and thereby preventing the corrupting and infecting action of the atmosphere upon the edible portion of the egg.

To carry my invention into effect, I preferably use shellac varnish of the ordinary consistency for the air-proof glazing on the shell of the egg, and I find that material, while it forms a perfect preservative coating, and gives additional strength to the structure of the shell, is free from any deleterious quality that will affect the flavor or condition of the contents of the egg. The glazing produced thereby is inodorous, and possesses a hard, smooth surface that is free from any tendency to become sticky or adhesive to other objects; but, when preferred, a preparation made of any hard gummy substance—like glue, isinglass, gum-arabic, or other suitable material—dissolved in water, acids, spirits, or other solvent that will reduce the substances to a liquid form and cause the coating to dry hard and be impervious to air, may be substituted for the shellac varnish for coating the eggs. The eggs are first subjected to the action of a gentle but dry heat for the purpose of expanding the air and gases contained in them and effecting the expulsion of a portion of said air and gases through the pores of the shell, and in effecting this part of my process great care must be observed to prevent the eggs from becoming heated to such a degree that their contents will be cooked or otherwise changed in condition, and I find by experience that a heat of about 90° Fahrenheit, or about "blood-heat," is sufficient for the purposes of my process. While the eggs are still warm they are immersed in the coating-liquid, and a sufficient quantity of said liquid will adhere to the shell of each egg to produce a perfect coat of glazing thereon. The eggs are next removed from the liquid by means of a wire scoop or other suitable utensil, and laid upon a net or rack, so that any superfluous quantity of the liquid may drain off. The warmth of the egg causes the coating to harden quickly, so that before the egg gets cold its shell is air-proof. As the egg grows cold the air and other contents of it contract, and thereby a partial vacuum is produced in each shell, to render most valuable aid in preserving the edible portion of the egg.

By treating eggs in the manner hereinabove described they will retain their freshness and purity in a perfect condition for many months.

What I claim, and desire to secure by Letters Patent, is—

The process for preserving eggs which consists in first subjecting the eggs to the action of gentle heat to expel a portion of the air and gases therefrom, as herein described, and, second, in applying to their shells a coating consisting of a cold solution of hard-drying adherent material that will strengthen their shells and render them impervious to air, substantially as herein specified.

FRANK J. PRADDEX.

Witnesses:
  WILLIAM H. LOW,
  JAS. C. HEMPHILL.